Patented Oct. 25, 1938

2,134,672

UNITED STATES PATENT OFFICE 2,134,672

PYRIDINE DERIVATIVES OF BARBITURIC ACIDS

Curt Raeth, Radebeul, near Dresden, and Rudolf Gebauer, Dresden, Germany, assignors to Chemische Fabrik von Heyden, A. G., Radebeul, Germany, a corporation of Germany No Drawing. Application March 30, 1934, Serial No. 718,204. In Germany March 31, 1933

7 Claims. (Cl. 260—258)

This invention relates to a new compound and a method of making the same.

We have obtained novel compositions of matter by a controlled reaction between pyridines and substituted barbituric acids. These new compounds appear to have a structure, in which each molecule contains predetermined proportions of both components of said reaction and they have characteristic physical properties which are clearly distinct from those of said components, the ingredients used in making those compounds. The new compounds differ, of course, in accordance with ingredients used in making them, and there may also be a difference in respect to the ratio at which such ingredients are comprised in the product.

Such new compounds may be produced from various pyridines. The required intimate contact between the component ingredients is brought about by mixing them in a fluid state. Thus the ingredients may be fused together in a predetermined proportion. Or the ingredients or component parts of the compound may react upon each other in a solution and the novel compound may be crystallized out, or may be obtained by evaporating the solvent. We may also prepare salts of barbituric acid and salts of the aforementioned pyridines and proceed by bringing about a reaction between such salts.

The invention may be best explained by way of some characteristic examples.

Example 1

2.3 parts of 4-hydroxy-5-nitropyridine and 3 parts of di-ethylbarbituric acid are dissolved in 60 parts (volume) of hot water. While the solution cools off a novel compound crystallizes out. The crystals have a novel molecular structure, comprising the components in the proportion of a molecule of $C_8H_{12}O_3N_2$ per molecule of $C_5H_4O_3N_2$, and this compound has a melting point of 245° centigrade. In diluted alkalis it is soluble with yellow color. It is not decomposed by diluted mineral acids or by boiling water. It can be recrystallized from water.

Example 2

1 part of di-ethylbarbituric acid and 2 parts of 2-ethoxy-5-acetamino-pyridine are fused together at 145° centigrade. The melted compound is a clear fluid. The solidified product may be recrystallized out of a water or benzol solution. This novel compound contains a molecule of $C_8H_{12}O_3N_2$ per two molecules of $C_9H_{12}O_2N_2$ and melts between 112° and 115° centigrade. By dissolving in water, solutions may be obtained, which contain one per cent of the new compound. The new compound proves to be less toxic than each of its components.

Example 3

12 parts of N-methyl-α-pyridone are introduced into a suspension of 16 parts of di-ethylbarbituric acid in 90 parts (volume) of hot benzol; dissolution takes place when the mixture is shaken and crystals of a novel compound are formed, while the solution cools off. The product contains the component ingredients $C_8H_{12}O_3N_2$ and $C_6H_7ON$ in like proportion. This novel compound has a melting point of approximately 120° centigrade. While the N-methyl-α-pyridone is an oil of evil taste and smell, most unsuitable for medical use, the new compound is an odorless powder of not disagreeable taste. By the action of alkalis, the new compound is decomposed into its components.

Example 4

17 parts of phenylethylbarbituric acid are intimately mixed with 8 parts of N-methyl-α-pyridon. Then heat is applied and solidification takes place. After cooling the resulting compound is powdered, triturated with ether and dried under vacuum. The resulting new compound contains the component ingredients at a ratio of a molecule of $C_{12}H_{12}O_3N_2$ per molecule of $C_6H_7ON$ and melts at approximately 122° centigrade. Its properties are very much like those of the product obtained according to Example 3.

Example 5

Prepare a hot solution of 20 parts of di-ethylbarbituric acid and 25 parts of α-aminopyridin in 100 parts (volume) of 20% alcohol. The crystals, which separate out during cooling, are dried by suction, washed in 20% alcohol and dried. They may be purified by dissolution in ether and by precipitation by means of petrol ether. In this novel compound the molecules are built up at the ratio of one molecule $C_8H_{12}O_3N_2$ to one molecule of $C_5H_6N_2$ and this novel composition of matter melts between 82° and 85° centigrade. It is easily soluble in most of the organic solvents. A saturated watery solution of the new compound contains 2 per cent of the latter and shows an alkaline reaction. The new compound has an anaesthetic action, its toxicity being considerably less than that of its components.

The said new compound may also be prepared by the above-described alternative method of a salt reaction.

Example 6

1 part of 3,5-diiodo-N-methyl-α-pyridone and 1 part of diethyl-barbituric acid are dissolved in 10 parts by volume of chloroform. On cooling the solution, there crystallizes a compound which melts at 184° C. and is composed of 2 molecular proportions of $C_8H_{12}O_3N_2$ and 1 molecular proportion of $C_6H_5ONI_2$. By alkalis it is decomposed into its components.

Example 7

1 part of N-methyl-2-pyridone-5-sulfonic acid and 1 part of 5-ethyl-5-piperidino-barbituric acid, the latter being obtained as for instance set out in Example 1 of the United States Patent No. 2,078,323, are dissolved in 4 parts by volume of hot water. On cooling the solution, there crystallizes a compound of 1 molecular proportion of $C_{11}H_{17}O_3N_3$ and 1 molecular proportion of $C_6H_7O_4NS$, containing 3 molecular proportions of water of crystallization. It forms white crystals of a bitter taste, easily soluble in water with acid reaction. On neutralizing this solution with sodium carbonate, the barbituric acid component is precipitated.

What we claim is:

1. The process of preparing molecular compounds of substitution products of pyridine, comprising reacting a pyridine with a C,C-disubstituted barbituric acid selected from the class of the dialkyl-, mononuclear-aryl-alkyl- and piperidino-alkyl- barbituric acids in a liquid state, and reducing the reaction product to a dry state.

2. The process of preparing molecular compounds of substitution products of pyridine, comprising fusing a pyridine with a C,C-disubstituted barbituric acid selected from a group of the dialkyl-, mononuclear-aryl-alkyl- and piperidino-alkyl-barbituric acids.

3. The process of preparing molecular compounds of substitution products of pyridine, comprising mixing a pyridine with a C,C-disubstituted barbituric acid in an organic solvent, said acid being selected from the group of the dialkyl-, mononuclear-aryl-alkyl- and piperidino-alkyl-barbituric acids.

4. As novel compositions of matter, molecular compounds of substitution products of pyridine, prepared by the reaction between a C,C-disubstituted barbituric acid selected from the group of the dialkyl-, mononuclear-aryl-alkyl- and piperidino-alkyl-barbituric acids and a pyridine.

5. Novel pyridine compounds consisting of C,C-disubstituted barbituric acids selected from the group of the dialkyl-, mononuclear-aryl-alkyl- and piperidino-alkyl-barbituric acids and a hydroxypyridine in molecular proportions.

6. A novel pyridine compound consisting of C,C-disubstituted barbituric acids selected from the group of the dialkyl-, mononuclear-aryl-alkyl- and piperidino-alkyl-barbituric acids and a pyridone in molecular proportions.

7. Novel pyridine compounds consisting of C,C-disubstituted barbituric acids selected from the group of the dialkyl-, mononuclear-aryl-alkyl- and piperidino-alkyl-barbituric acids and an aminopyridine in molecular proportions.

CURT RAETH.
RUDOLF GEBAUER.